(12) United States Patent
Che

(10) Patent No.: US 7,941,770 B2
(45) Date of Patent: May 10, 2011

(54) SYSTEM AND METHOD FOR IMPLEMENTING AN ONLINE DESIGN PLATFORM FOR INTEGRATED CIRCUITS

(75) Inventor: Ker-Min Che, Hsinchu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 854 days.

(21) Appl. No.: 11/626,951

(22) Filed: Jan. 25, 2007

(65) Prior Publication Data

US 2008/0184174 A1 Jul. 31, 2008

(51) Int. Cl.
*G06F 17/50* (2006.01)
(52) U.S. Cl. ......... 716/104; 716/126; 716/139; 703/14
(58) Field of Classification Search ............ 716/104, 716/126, 139
See application file for complete search history.

(56) References Cited

U.S. PATENT DOCUMENTS

| 6,578,174 B2 * | 6/2003 | Zizzo ............................ 716/1 |
| 7,613,599 B2 * | 11/2009 | Bade et al. ..................... 703/14 |
| 2007/0201442 A1 * | 8/2007 | Hekmatpour et al. ........ 370/356 |
| 2008/0188963 A1 * | 8/2008 | McCoy ........................... 700/90 |

* cited by examiner

*Primary Examiner* — Thuan Do
(74) *Attorney, Agent, or Firm* — Haynes and Boone, LLP

(57) ABSTRACT

One embodiment is a method of designing an integrated circuit ("IC") using an online design platform system comprising a design platform provider, at least one electronic design automation ("EDA") tool and at least one intellectual property ("IP") library. The method comprises accessing the design platform provider using a computer remote from the design platform provider, wherein the remote computer is connected to the design platform provider and the accessing occurs via an Internet connection; providing access via the remote computer to the at least one EDA tool and the at least one IP library for enabling a user at the remote computer to design an IC; and providing at least one file comprising a final design of the IC directly from the online design platform system to a designated foundry.

20 Claims, 2 Drawing Sheets

SYSTEM AND METHOD FOR IMPLEMENTING AN ONLINE DESIGN PLATFORM FOR INTEGRATED CIRCUITS

BACKGROUND

Electronic Design Automation ("EDA"), also referred to as Electronic Computer Aided Design ("ECAD"), tools are used for designing and producing electronic systems, such as integrated circuits ("ICs"). EDA has grown rapidly with the continuous scaling of semiconductor technology. Users include, for example, semiconductor fabrication facilities, or "fabs", and design-service companies. IC designers at semiconductor companies must use EDA tools, as large ICs are too complex to design manually.

Current digital flows are extremely modular; standardized design descriptions can be compiled into invocations of "cells", which implement logic or other electronic functions using a particular integrated circuit technology. Fabricators generally provide libraries of components for their production processes, with simulation models that fit standard simulation tools.

EDA can be divided into numerous sub-areas, which generally align with the path of manufacturing from design to mask generation. Such subareas may include, for example, schematic design, simulation, synthesis, place and route ("P&R"), and physical verification ("PV"), which may involve design rule checking ("DRC"), layout versus schematic ("LVS") checking, and layout extraction ("RCX").

For obvious reasons, it is very expensive for a design house to maintain a full EDA environment. In addition to purchasing tools, such as those described above, as well as others, from the various EDA tool vendors, the design house must license an IP library comprising standard subcircuit and cell designs, from the appropriate parties. Additionally, the design house must employ persons possessing the skills necessary for maintaining and repairing the EDA tools, or must pay the vendor for such support.

BRIEF DESCRIPTION OF THE DRAWINGS

The features and advantages of a system and method for implementing an online design platform for ICs in accordance with an embodiment will be more clearly understood from the following description taken in conjunction with the accompanying drawings in which like reference numerals designate similar or corresponding elements, regions, and portions, and in which.

DETAILED DESCRIPTION

Figure 1:
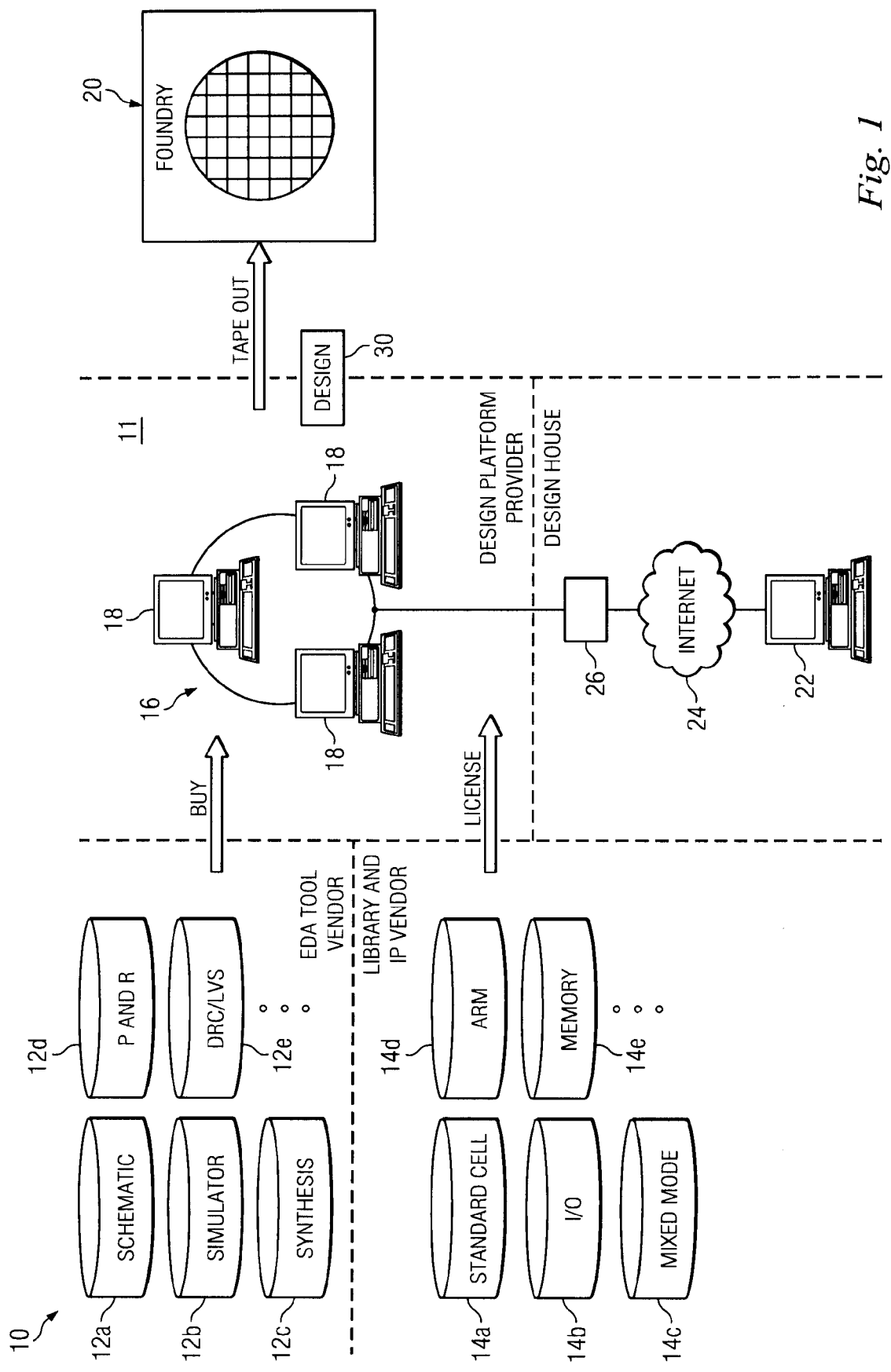
FIG. 1 is a block diagram illustrating implementation of an online design platform for ICs in accordance with one embodiment.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 is a block diagram illustrating implementation of an online design platform system 10 in accordance with one embodiment. In the illustrated embodiment, a design platform provider 11 purchases one or more EDA tools, which may include, for example, a schematic design tool 12$a$, a simulation tool 12$b$, a synthesis tool 12$c$, a P&R tool 12$d$, and a DRC/LVS tool 12$e$, from one or more EDA tool vendors. It will be recognized that additional EDA tools from various vendors may also be included. Additionally, the design platform provider 11 licenses one or more IP libraries, such as a standard cell library 14$a$, an I/O library 14$b$, a mixed-mode IP library 14$c$ (which may comprise phase locked loops ("PLLs"), digital-to-analog converters ("DACs"), analog-to-digital converters ("ADCs"), mixers, amplifiers, voltage regulators, etc.) 14$c$, an ARM library 14$d$, and a memory library 14$e$, from various sources. It will be recognized that other libraries may be included as desired.

As shown in FIG. 1, the design platform provider 11 comprises a network 16 including a plurality of computer systems 18 on which the EDA tools 12$a$-12$e$ are implemented and which have access to the libraries 14$a$-14$e$. In particular, the network 16 comprises a complete EDA design solution; in other words, a designer sitting at one of the computers 18 could design a complete IC from start (i.e., specification) to finish (i.e., tape-out to a foundry 20).

In accordance with features of one embodiment, a user at a computer 22 remote from the network 16 of the design platform provider 11 may access the network via an Internet connection 24. In one embodiment, the network includes an access system 26 for limiting access to the network 16 to authorized users. For example, the access system 26 may require a user to log in with a valid, recognized user name and password before granting access to the network 16. It will be recognized that the access limitation functions described herein may be implemented in any number of manners known to those of ordinary skill in the art.

Once a user has gained access to the network 16, either via the access system 26 or otherwise, the user is able to remotely control one or more of the systems 18 via the user's computer 22 to design a complete IC from start to finish (i.e., tape-out to the foundry 20). In particular, the final tape-out is performed at the request and under the control of the user and a database 30 comprising a plurality of design files comprising the final design is passed directly from the design platform provider 11 to the foundry 20 to protect the IP embodied in the design. At no time is the database 30 provided to the user's computer 22, thereby protecting the licensed IP.

In this manner, the user, which may be, for example, a design house, is spared the expense of purchasing the EDA tools 10 and licensing the libraries 14$a$-14$e$. It is anticipated that the user will pay a fee associated with the user of the network 16, such as, for example, a run time fee based on the amount of time the user is connected to the network.

Figure 2:
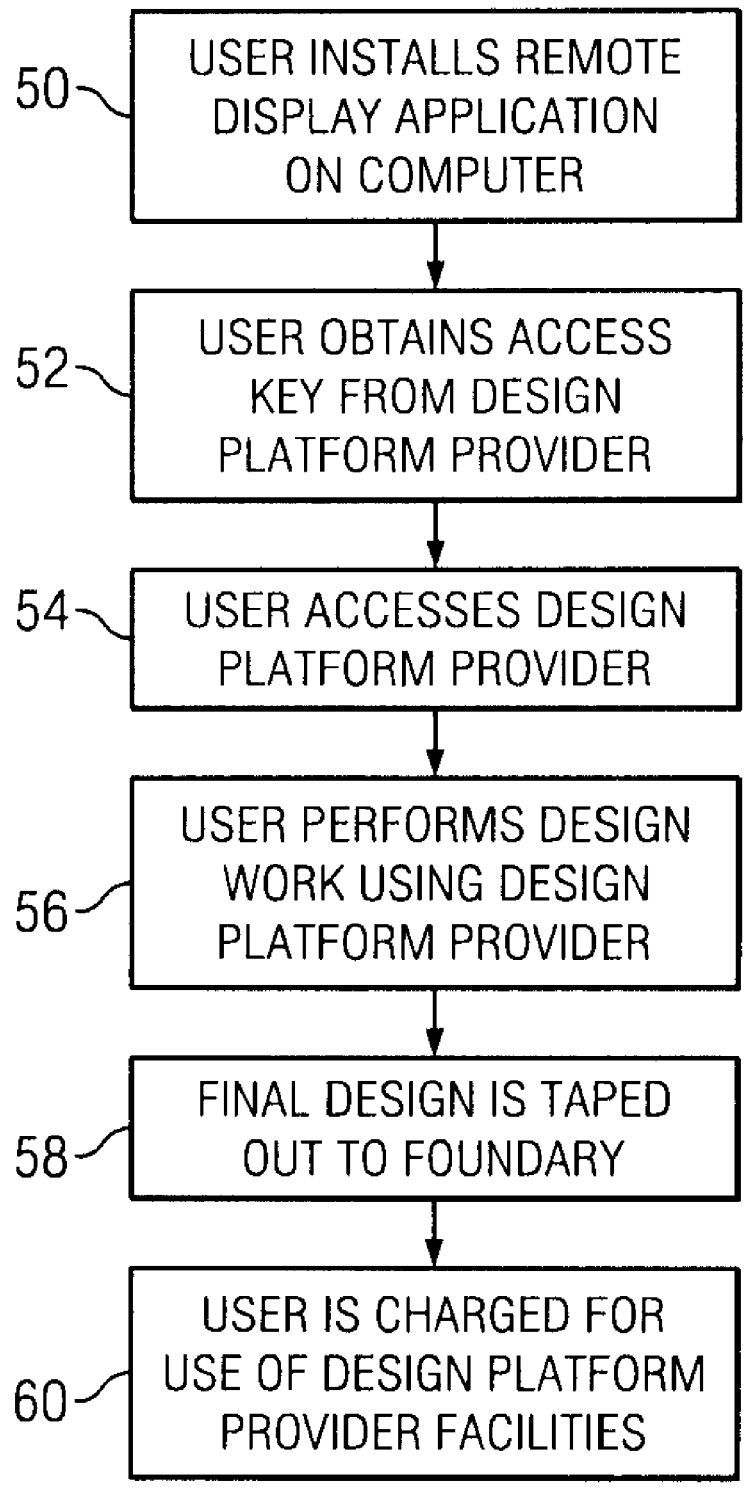
FIG. 2 is a flowchart illustrating operation of an online design platform for ICs in accordance with one embodiment.

FIG. 2 is a flowchart illustrating a method of implementing an online design platform system 10 in accordance with one embodiment. In step 50, a user installs a remote display software application, such as "Reflections", on his local computer. In step 52, the user obtains an access key (such as a password and/or user ID) from the design platform provider. The access key can be implemented via hardware (such as an encryption chip) or software (such as an encryption program). In step 54, the user accesses the design platform via an Internet connection, such as by logging into the design platform network using the access key provided in step 52. In this embodiment, an authentication of the access key provided is performed in this step. In step 56, after the user is permitted access to the system, the user performs his design work (e.g., schematic design, simulation, synthesis, layout, etc.) by accessing the design tools and/or libraries on the design platform without downloading the database; that is, the local computer functions merely as a display terminal. All of the design databases are maintained by the design platform provider. In step 58, the final design is taped out from the design platform provider directly to the designated foundry. In step 60, the user is charged for his use of the design platform. It will be recognized that the step of charging the user may be performed at any point during the design process or at various times throughout the design process. The fee charged may be a flat fee per IC design, a fee based on the amount of time the user spent using the platform, or a fee based on the resources used by the user. Other fee arrangements may also be implemented.

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims. In the claims, means-plus-function clauses are intended to cover the structures described herein as performing the recited function and not only structural equivalents, but also equivalent structures.

What is claimed is:

1. A method of designing an integrated circuit ("IC") using an online design platform system comprising a design platform provider including at least one electronic design automation ("EDA") tool and at least one intellectual property ("IP") library, the method comprising:
    accessing the design platform provider using a computer remote from the design platform provider, wherein the remote computer is connected to the design platform provider and the accessing occurs via an Internet connection;
    providing access via the remote computer to the at least one EDA tool and the at least one IP library for enabling a user at the remote computer to design an IC; and
    providing at least one file comprising a final design of the IC directly from the online design platform system to a designated foundry; and
    preventing the at least one file from being downloaded to the remote computer;
    wherein the at least one EDA tool comprises a tool selected from a group consisting of an IC schematic design tool, a simulation tool, a synthesis tool, a P&R tool, and a DRC/LVS tool.

2. The method of claim 1 further comprising, prior to the accessing, obtaining an access key from the design platform provider, wherein the accessing further comprises providing the access key from the remote computer to the design platform provider and wherein access to the design platform provider is selectively provided based on an authentication of the access key provided from the remote computer.

3. The method of claim 1 further comprising installing a remote display software application on the remote computer.

4. The method of claim 1 wherein the design platform provider comprises a plurality of computers connected via a network.

5. The method of claim 1 wherein the providing access is performed by an access system of the online design platform system.

6. The method of claim 1 wherein the foundry is designated by the user.

7. The method of claim 1 wherein the at least one IP library comprises a library selected from a group consisting of a standard cell library, an input/output library, a mixed mode library, an ARM library, and a memory library.

8. An online design platform system for enabling the design of an integrated circuit ("IC"), the online design platform system comprising:
    a design platform provider including at least one electronic design automation ("EDA") tool and at least one intellectual property ("IP") library;
    means for accessing the design platform provider using a computer remote from the design platform provider, wherein the remote computer is connected to the design platform provider via an Internet connection;
    means for providing access via the remote computer to the at least one EDA tool and the at least one IP library for enabling a user at the remote computer to design an IC; and
    means for providing at least one file comprising a final design of the IC directly from the online design platform system to a designated foundry;
    wherein the at least one file is prevented from being downloaded to the remote computer; and
    wherein the at least one EDA tool comprises a tool selected from a group consisting of an IC schematic design tool, a simulation tool, a synthesis tool, a P&R tool, and a DRC/LVS tool.

9. The system of claim 8 further comprising means for providing an access key to the remote computer, wherein access to the design platform provider by the remote computer is selectively provided based on an authentication of the access key provided from the remote computer.

10. The system of claim 8 further comprising a remote display software application installed on the remote computer.

11. The system of claim 8 wherein the design platform provider comprises a plurality of computers connected via a network.

12. The system of claim 8 wherein the means for providing access comprises an access system.

13. The system of claim 8 wherein the tbundry is designated by the user.

14. The system of claim 8 wherein the at least one IP library comprises a library selected from a group consisting of a standard cell library, an input/output library, a mixed mode library, an ARM library, and a memory library.

15. A system for implementing an online design platform for enabling the design of an integrated circuit ("IC"), the system comprising:
    a design platform provider comprising a computer connected to access at least one electronic design automation ("EDA") tool and at least one intellectual property ("IP") library; and
    a user terminal connectable to the design platform provider via an Internet connection, the user terminal having installed thereon remote display applications software for enabling a user at the user terminal to remotely control the design platform provider to design an IC using the at least one EDA tool and the at least one IP library for enabling a user at the remote computer to design an IC; and
    wherein, upon completion of the design of the IC, the design platform provider provides at least one file comprising a final design of the IC directly to a designated foundry; and
    wherein the at least one file is prevented from being downloaded to the remote system; and wherein the at least one EDA tool comprises a tool selected from a group consisting of an IC schematic design tool, a simulation tool, a synthesis tool, a P&R tool, and a DRC/LVS tool.

16. The system of claim 15 further comprising an access key provided to the remote computer, wherein access to the design platform provider by the remote computer is selectively provided based on an authentication of the access key provided from the remote computer.

17. The system of claim 15 wherein the user is charged for use of the system based on an amount of time the user has accessed the system.

18. The system of claim 15 wherein the user is charged for use of the system based on an identity of resources used by the user.

19. The system of claim 15 wherein the foundry is selected by the user.

20. The system of claim 15 wherein the at least one IP library comprises a library selected from a group consisting of a standard cell library, an input/output library, a mixed mode library, an ARM library, and a memory library.

* * * * *

UNITED STATES PATENT AND TRADEMARK OFFICE
CERTIFICATE OF CORRECTION

PATENT NO. : 7,941,770 B2
APPLICATION NO. : 11/626951
DATED : May 10, 2011
INVENTOR(S) : Ker-Min Chen Page 1 of 1

It is certified that error appears in the above-identified patent and that said Letters Patent is hereby corrected as shown below:

On the title page, item (75) Inventor: change "Che" to "Chen"

Signed and Sealed this
Twenty-sixth Day of July, 2011

David J. Kappos
*Director of the United States Patent and Trademark Office*